US009770840B2

(12) United States Patent
Wangler et al.

(10) Patent No.: US 9,770,840 B2
(45) Date of Patent: Sep. 26, 2017

(54) WASHABLE STACKER APPARATUS WITH SELF-TENSIONING FEATURE FOR USE WITH A FOOD SLICING MACHINE

(71) Applicants: Eric J Wangler, Rochester, NY (US); David P Prior, Rochester, NY (US); Hermann Scharfen, Witten (DE)

(72) Inventors: Eric J Wangler, Rochester, NY (US); David P Prior, Rochester, NY (US); Hermann Scharfen, Witten (DE)

(*) Notice: Subject to any disclaimer, the term of this patent is extended or adjusted under 35 U.S.C. 154(b) by 0 days.

(21) Appl. No.: 15/146,383

(22) Filed: May 4, 2016

(65) Prior Publication Data

US 2016/0325456 A1 Nov. 10, 2016

Related U.S. Application Data

(60) Provisional application No. 62/158,299, filed on May 7, 2015.

(51) Int. Cl.
*B65G 23/44* (2006.01)
*B26D 7/32* (2006.01)

(52) U.S. Cl.
CPC ............ *B26D 7/32* (2013.01); *B26D 2210/02* (2013.01)

(58) Field of Classification Search
CPC ...................................................... B65G 23/44
USPC ............................ 198/810.04, 812, 813, 814
See application file for complete search history.

(56) References Cited

U.S. PATENT DOCUMENTS 3,955,689 A 5/1976 Wallace
3,956,518 A 5/1976 Goldbach
4,015,494 A 4/1977 Spooner et al.
4,309,927 A 1/1982 Dennis et al.
4,321,847 A 3/1982 Dillon
4,344,341 A 8/1982 Lotz
4,428,263 A 1/1984 Lindee et al.
4,532,751 A 8/1985 Mally et al.
4,545,447 A 10/1985 Spooner et al.
4,712,458 A 12/1987 Mally
4,793,228 A 12/1988 Etter et al.
4,881,928 A * 11/1989 Bernal ...................... F16H 7/06 474/111
5,026,326 A * 6/1991 Pollich ...................... F16H 7/12 198/813
5,101,702 A 4/1992 Kuchler
5,724,874 A 3/1998 Lindee et al.
(Continued)

*Primary Examiner* — Douglas Hess
(74) *Attorney, Agent, or Firm* — John C. McMahon

(57) ABSTRACT

An improved food slice stacker that can be coupled to a meat slicer, to automatically stack the slices on food into stacks, wherein the stacker can be easily washed and sanitized to remove food particles therefrom. The stacker includes a frame with a pair of spaced apart parallel supports that support a transport mechanism. The transport mechanism includes a plurality endless transport chains, an integrally formed sprocket sleeve with sprocket portions that engage and drive the chains and an integrally formed pulley sleeve with a smooth surface an a plurality of pulley members that also engage the transport chains, wherein the sprocket and pulley sleeves are spaced apart from each other, and wherein the pulley sleeve engages the transport member. The pulley sleeve is integrally formed of a friction-free material so as to provide for smooth surfaces that substantially prevent retention of food particles thereon during washing.

11 Claims, 4 Drawing Sheets

(56) References Cited

U.S. PATENT DOCUMENTS

| | | | | | |
|---|---|---|---|---|---|
| 5,934,449 | A * | 8/1999 | Dolan | B65G 17/08 | 198/806 |
| 6,763,750 | B2 * | 7/2004 | Lindee | B26D 7/32 | 198/468.11 |
| 6,843,365 | B2 * | 1/2005 | Baker | B65G 47/54 | 198/813 |
| 7,832,316 | B2 * | 11/2010 | Weber | B26D 9/00 | 198/357 |
| 8,113,339 | B2 * | 2/2012 | Lenord | B65G 23/10 | 198/832 |
| 8,322,970 | B2 * | 12/2012 | Ward | F01L 1/3442 | 198/721 |
| 8,627,941 | B2 * | 1/2014 | Lindee | B25J 9/0093 | 198/395 |
| 8,683,903 | B2 * | 4/2014 | Strong | B23D 47/045 | 198/626.4 |
| 8,770,378 | B2 * | 7/2014 | Bauer | B65G 21/12 | 198/369.2 |

* cited by examiner

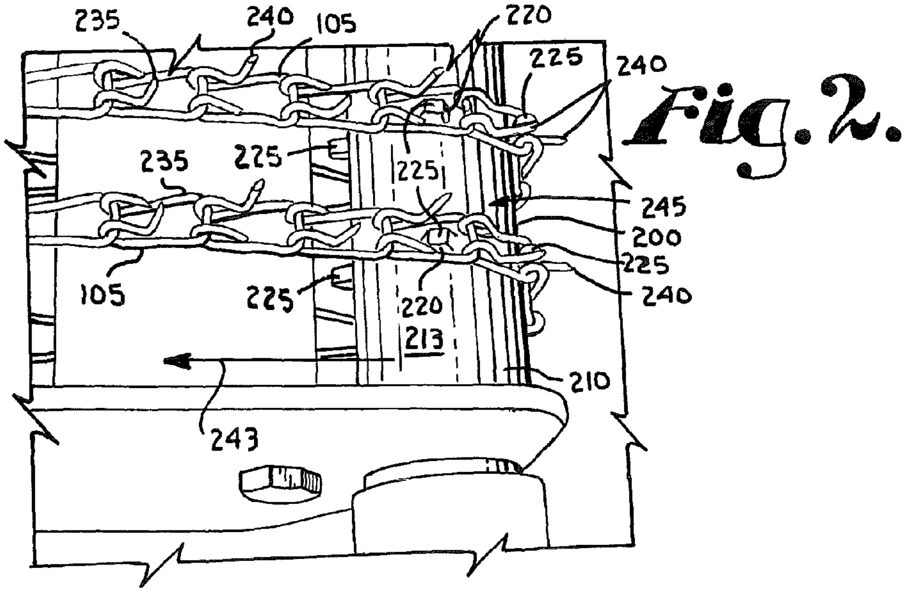
Fig. 2.
Fig. 3.
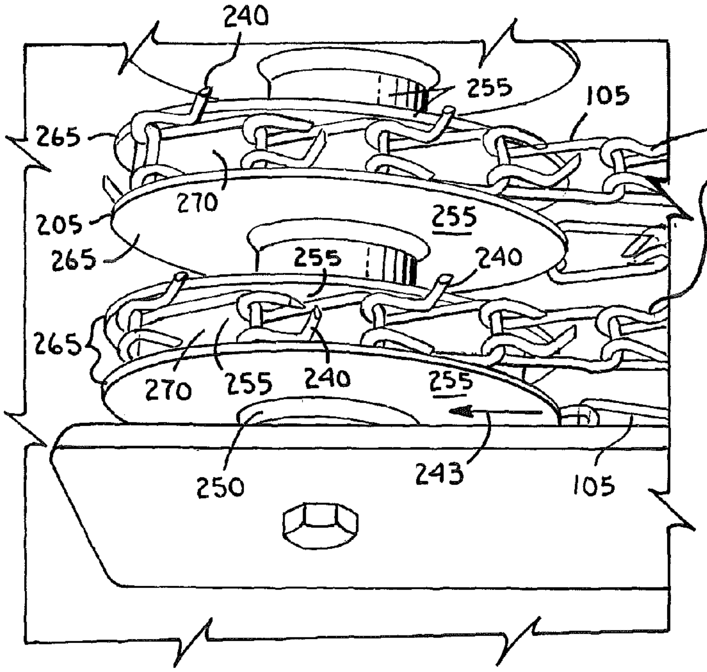
Fig. 9.
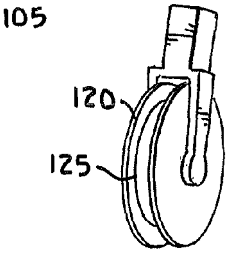
Fig. 10.
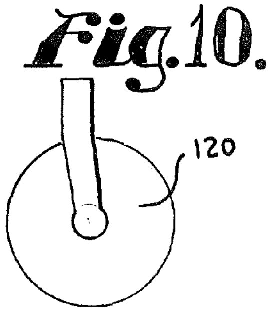

WASHABLE STACKER APPARATUS WITH SELF-TENSIONING FEATURE FOR USE WITH A FOOD SLICING MACHINE

CROSS-REFERENCE TO RELATED APPLICATIONS

This application claims the benefit of U.S. Provisional Application No. 62/158,299 filed May 7, 2015, which is incorporated by reference herein.

BACKGROUND OF THE INVENTION

The present invention relates to a stacker apparatus that is cleanable, for use with a food slicing machine, such as a meat slicer or slicing station. The stacker of the present invention includes an upstream drive sprocket sleeve with a plurality of sprocket members, and a downstream unitary pulley sleeve with an equal number of integral pulley members that are aligned with the sprocket members so as to provide a plurality of spaced apart pulley-sprocket pairs. Each pulley-sprocket pair supports and engages a transport chains, such that the transport chains move synchronously to transport a slice of food thereon. Due to this simple construction, the stacker is very easy to clean and sanitize, so as to prevent food-born illness during subsequent uses of the stacker.

Food slicing machines are well known in the art and can be found in meat processors, sandwich shops, delis and grocery stores. Such slicing machines are often used to slice cheese and meats into individual slices of a predetermined thicknesses. As is known in the art, such slicing machines generally include a motorized slicing blade that receives and cuts the food, an input structure for supporting and feeding the food into the blade, a thickness control mechanism for determining the thickness of the food slices, and a discharge mechanism for expelling the food slices from the slicer.

In hi-throughput settings, such as a meat processing setting, the food slicer may be functionally engaged with or coupled to a food slice stacking device, so that food slices expelled from the slicer are received by the stacker and then transferred to a stacking station, where the slices can be stacked into a food slice stack. Such coupled slicers and stackers are often automated and synchronized, so that the coupled slicer and stacker cut and stack a pre-determined number of food slice stacks, wherein each stack includes a pre-determined number of food slices of a defined thickness.

Prior art stackers include a frame supporting several adjacent and vertically aligned downstream spring-loaded pulleys and an equal number of adjacent and vertically aligned upstream sprockets. Each spring-loaded pulley includes an individual pulley engaged with tensioning springs located withing an adjacent stainless steel housing. Each of the spring-loaded pulleys is horizontally aligned with one of the sprockets, thereby providing several pulley-sprocket pairs. Each pulley-sprocket pair supports and engages an endless transport loop, such as a chain loop, that includes a plurality of food slice-receiving members, such as sharpened prongs, hooks or teeth. The sprockets rotate so that the engaged transport loops move across the front of the stacker, from an upstream end, which includes the sprockets, toward a downstream end, which includes the pulleys. Thus, a food slice pressed onto the front of the stacker is transported or conveyed in a downstream direction to a stacking station, where a transfer fork detaches the slice from the engaged slice-receiving members and then transfers it to a stacking surface, such as a scale or a conveyor belt.

To wash and sanitize the stacker, the spring-loaded pulleys and chains must be completely disassembled. After washing, the stacker parts must be reassembled. Disassembling and reassembling the stacker is time consuming and difficult, due to the large number of complex parts. Due to this time consumption and difficulty, users tend to avoid disassembling and reassembling the stacker, and instead wash the assembled stacker. Unfortunately, this practice leads to food particles remaining in the pulleys after cleaning. As is well known in the art, food particles remaining on such food handling equipment can lead to food-born illness. Consequently, the prior art stacker is unsuitable for use with food.

SUMMARY OF THE INVENTION

The present invention provides a simplified food slice stacker that can be easily washed and sanitized as an assembled unit, does not retain food particles and is therefore suitable for use in food handling and preparation. The present invention eliminates the plurality of spring-loaded pulleys of the prior art stacker in favor of a single, unitary pulley sleeve with a plurality of pulley members. Similarly, individual sprockets are replaced by a single, unitary sprocket sleeve with a plurality of sprocket members. The pulley members and sprocket members are paired, so as to support and drive an equal number of continuous pronged transport chains. Due to the limited number of parts and smooth unitary construction of the pulleys and sprockets, the stacker of the present invention can be thoroughly washed and sanitized, either by hand or in a washing machine. The transport chains provide for some tensioning. However, in further embodiments, the stacker includes a tensioning mechanism that applies pressure to the transport chains. In one aspect, the tensioning mechanism include a leaf spring with and attached guide member that engages each of the transport chains. In another aspect, a pair of leaf springs is joined with each of the guide members. In yet another aspect, the tensioning mechanism is reversibly engageable, so that disengagement of the tensioning mechanism loosens the transport chains so as to increase the ease with which the stacker can be cleaned.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is an enlarged view of a portion of the upstream end of the stacker of FIG. 1, with portions broken away to show greater detail thereof, illustrating engagement of the transport chains with the sprocket members of the sprocket sleeve.

FIG. 3 is an enlarged view of a portion of the downstream end of the stacker of FIG. 1, with portions broken away to show greater detail thereof, illustrating engagement of the transport chains with the pulley members of the pulley sleeve.

FIG. 9 is an enlarged perspective view of a pulley member of FIG. 8.

FIG. 10 is side view of the pulley member of FIG. 9.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
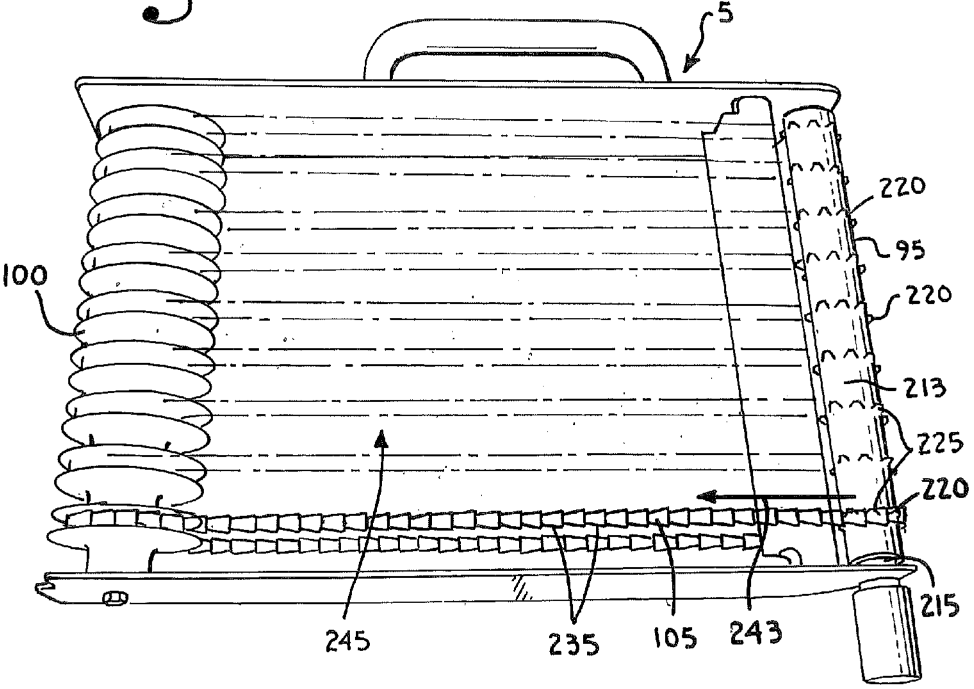
FIG. 1 is a perspective view of a first embodiment of the stacker of the present invention.

Referring now to FIGS. 1-3, the reference numeral 5 generally represents an improved food slice stacking apparatus of the present invention, in a first embodiment. The stacking apparatus 5, also referred to herein as a stacker 5, is structured to be coupled with a food slicing device or slicer, generally 10, such as described in greater detail below and with regard to FIG. 7. The stacker 5 of the present invention is described in greater detail below.

Figure 7:
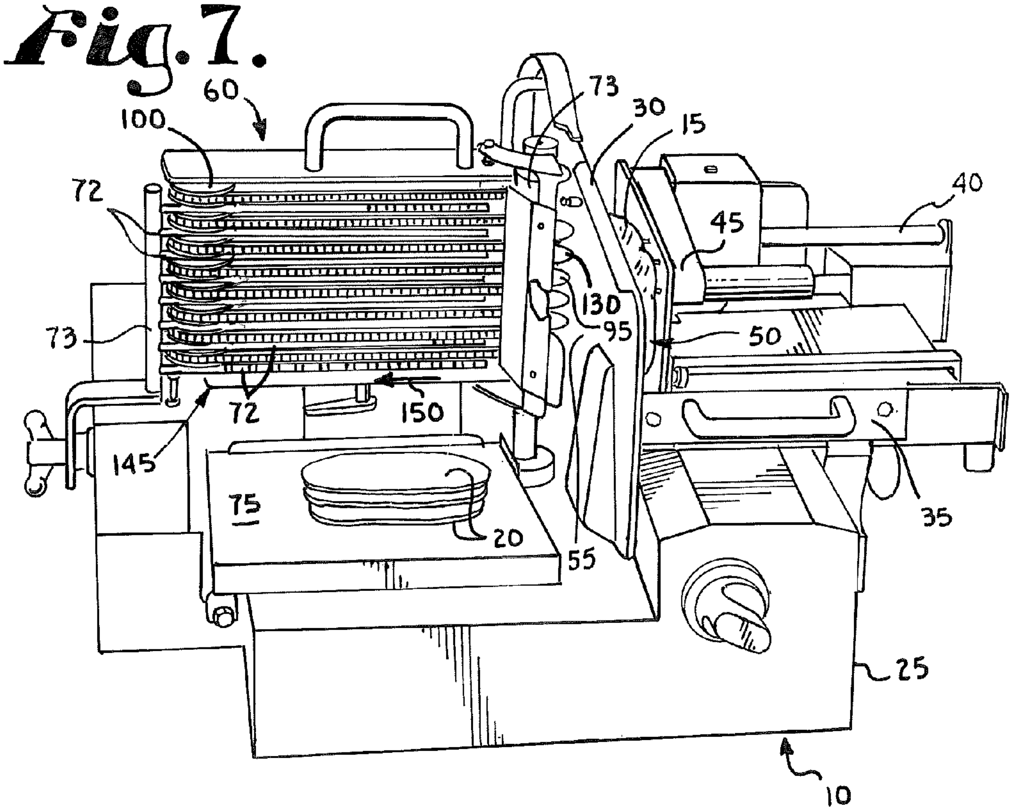
FIG. 7 is a perspective view of a meat slicer coupled with a stacking apparatus of the prior art.
Figure 8:
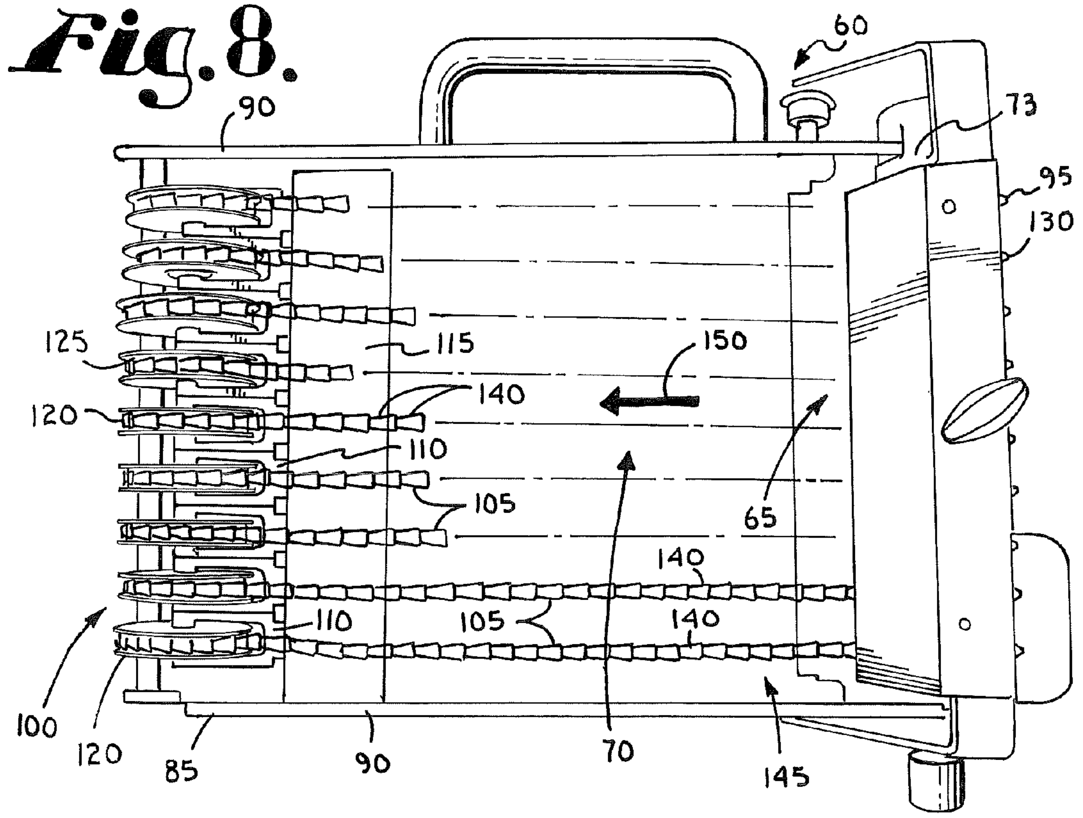
FIG. 8 is an enlarged view of the prior art stacker of FIG. 7.

Referring now to FIGS. 7-8, food slicers 10 are well known and are referred to by a variety of names, such as meat slicers, a food loaf slicers and cold-cut cutters. Such slicers 10 are used to cut a food loaf 15, such as meat or cheese, into a plurality of food slices 20. Exemplary food slicers 10 can be found in U.S. Pat. Nos. 3,956,518, 4,793,228, 5,101,702 and 5,724,874, each of which is incorporated herein by reference in its entirety.

Broadly speaking, food slicers 10 include a support frame 25, a slicing blade (not shown) in a blade housing 30 and a reciprocally movable food support 35. The food support 35 receives the food loaf 15, such as a block of cheese or a piece of meat to be cut into cold-cuts (i.e., slices 20). A pushing subassembly 40, such as a spring-loaded or weighted conveyor member 45, advances the food loaf 15 into an upstream side, generally 50, of the blade housing 30. As the food loaf 15 is engaged by the blade (not shown), the food support 35 is pushed and pulled, or otherwise moved, back and forth across the blade (not shown), or crosswise with respect to the blade housing 30, so that the food loaf 15 is contacted by and sliced by the blade (not shown), so as to produce the slices 20. As each slice 20 is cut from the food loaf 15, it is expelled from the downstream side 55 of the blade housing 30 and the pushing member 40 advances the food loaf 15 toward the blade (not shown).

FIGS. 7-10 illustrate a prior art stacker 60. During used, the stacker 60 coupled to and synchronized with the slicer 10, so that slices 20 expelled from the slicer 10 are received at an upstream stacker receiving station, generally 65. At the receiving station 65, a roller subassembly 67 presses each slice 20 onto the stacker 60. The stacker 60 transports the received slices 20 to a downstream stacking station, generally 70. Then, the tines 72 of a transfer fork 73 transfer the slices 20 from the stacking station 70 to a stacking surface 75 of the slider support frame 25. As the transfer fork 73 moves the slices 20 from the stacking station 70 to the stacking surface 75, a stack 80 of slices 20 is formed. The stacker 60 is coupled with the slicer 10, in a well known manner per se, so as to be synchronized therewith. Some prior art stackers 80 are described in U.S. Pat. Nos. 4,793,228 and 5,101,702, each of which is incorporated herein by reference in its entirety.

As is more easily seen if FIGS. 8-10, the prior art stacker 60 includes a frame 85 with spaced apart parallel upper and lower frame members 90, an upstream sprocket subassembly 95, a downstream pulley subassembly, generally 100, and a plurality of spaced apart endless transport members 105, or transport loops, such as transport chains 105. The sprocket subassembly 95 and the pulley subassembly 100 are spaced apart and parallel with each other, so as to be perpendicular to the upper and lower frame members 90. The sprocket and pulley subassemblies 95 and 100, respectively, engage and drive the tensioned transport members 105, such as is described in greater detail below.

The pulley subassembly 100 includes a plurality of individual spring loaded pulley members 110 (see FIGS. 9-10) engaged with a spring housing 115. The pulley members 110 (see FIGS. 9-10) each include a pulley 120 and a pair of springs (not shown) that are housed within the spring housing 115. Each pulley 120 (see FIG. 9.) includes a groove 125 that slidingly receives and engages one of the transport members 105 so as to guide and tension the transport members 105. As mentioned above, a disadvantage of the pulley assembly 100 is that its numerous components (i.e., the pulleys 120, springs and spring housing 115) must be disassembled to be sufficiently cleaned for use with food. Due to its complexity, the pulley assembly 100 provides numerous surfaces, nooks and crannies that cannot be directly or easily accessed by a cleaning device, such as a dishwasher. Consequently, the prior art stacker 60 is prone to retaining food particles (not shown) thereon and is not suitable for food use.

The prior art sprocket subassembly 95 includes a plurality of sprockets 130 with teeth (not shown) that engage and drive the transport members 105. In particular, when the transport member 105 is an endless chain loop 105, the sprocket teeth (not shown) releasably engage the chain links 140 as the sprocket assembly 95 rolls forwards in a clockwise direction, such as is known in the art. Each sprocket 130 is horizontally aligned with one of the pulleys 120 and positioned so that the transport chains 105 are evenly spaced apart and parallel with one another. The sprockets 130 turn, roll or rotate such that the transport members 105 are moved or driven from the receiving station 65, which is associated with the sprocket subassembly 95, toward the stacking station 70, which is midway between the pulley subassembly 100 and the sprocket subassembly 95.

FIGS. 1 through 3 illustrate the improved stacker 5, in a first embodiment. The stacker 5 is similar to the prior art stacker 60 in many ways. In particular, the improved stacker 5 can be coupled with a slicer 10 in the same manner as the prior art stacker 60. Similar to the prior art stacker 60, the improved stacker 5 includes a frame 85 with upper and lower frame members 90, a plurality of tensioned endless transport members 105, a receiving station 65, a stacking station 70 and a front 145. When coupled with a slicer 10, the stacker 5 receives food slices 20 at the receiving station 65 and transports them downstream to the stacking station 70, where the slices 20 are removed and stacked by a transfer fork 73, such as is known in the art.

Instead of a sprocket subassembly 95 and a pulley subassembly 100, each of which has multiple components, the improved stacker 5 includes an upstream sprocket sleeve 200 and a downstream pulley sleeve 205, each of which is described in greater detail below. The sprocket sleeve 200 and the pulley sleeve 205 are each integrally formed with a smooth non-stick low-friction surface, so as to eliminate the multiple parts of the sprocket and pulley subassemblies 95, 100. Due to this unitary construction, there are few if any surfaces that can harbor food particles or bacteria, thereby rendering the stacker 5 safe and suitable for food use. The sprocket sleeve 200 and the pulley sleeve 205 engage and actuate the transport members 105, such as described below with respect to FIGS. 2-3.

Referring now to FIG. 2, the sprocket sleeve 200 includes a tube-like cylindrical first sleeve member 210 that is slidingly received over a frame support rod 215 (see FIG. 1). The frame support rod 215 is connected or fixed to the frame members 90 so as to be perpendicular thereto. The first sleeve member 210 is formed, or molded, of a resilient polymer and has a smooth outer surface 213, so as to prevent the attachment of food particles (not shown) thereto. As is known in the art, the first sleeve member 210 can be coated with a non-stick material, such as Polytetrafluoroethylene (PTFE). A plurality of sprocket groups 220 are integrally formed on and radiate outwardly from the outer surface 213. The sprocket groups 220 are arranged along the length of the sleeve member 210 so as to be evenly spaced thereon. Each sprocket group 220 includes a plurality of radially extending sprocket teeth, detents or small projections 225 that are evenly spaced about the circumference of the sleeve member 210.

The transport members 105 of the stacker 5 are equal in number to the sprocket groups 220. In the illustrated embodiment, each transport member 105 is an endless chain 105 that includes a plurality of chain links 235 with outwardly extending prongs or hooks 240. The prongs 240 are oriented so as to face outwardly across the stacker front, generally 245. Each chain 105 loops around the sprocket sleeve 200 so as to be engaged and driven by one of the sprocket groups 220. In particular, as the sprocket sleeve 200 rolls or rotates forwards (i.e., clockwise when viewed from above), the sprocket teeth 225 reversibly extend through the links 235 so that the chain 105 is driven in a downstream direction (see arrow 243) across the stacker front 245.

Referring now to FIG. 3, the pulley sleeve 205 includes a cylindrical second sleeve member 250 with a tube-like shape. The second sleeve member 250 is received over a second frame support rod (not shown) that is also fixed to the frame members 90, so as to be perpendicular to the frame members 90. The pulley sleeve 205 is integrally formed of a resilient, non-porous polymer that provides a substantially smooth, non-stick surface 255. In certain embodiments, the surface 255 is a low-friction surface 255. In certain embodiments, the pulley sleeve 205 is coated or painted with a non-stick material, such as polytetrafluoroethylene (i.e., PTFE) or related polymers, such as is known in the art.

Each pulley sleeve 205 includes a plurality of pulley members 260 equally spaced along the length of the pulley sleeve 205. The number of pulley members 260 is equal to the number of sprocket groups 220. Further, each of the pulley members 260 is paired with an opposed sprocket group 220 so as to provide sprocket-pulley pairs that are aligned with each other along an axis that is perpendicular to the sprocket and pulley sleeves 200 and 205.

Each pulley member 260 includes a pair of parallel side members 265, such as radially extending flanges or plates, that are joined together so as to form a central grove portion 270 therebetween. A transport member 105 is received between the side members 265 so as to slidingly engage the groove portion 270. The smooth outer surface 255 of the pulley member 260, such as the outer surface 255 of the side members 265 and the groove portion 270, enable the transport member 105 to slide freely through the pulley member 260. In some embodiments, the pulley sleeve 205 is stationary and the transport members 105 slide through the respectively associated pulley member 260, in response to actuation, or rolling, of the sprocket sleeve 200, which drives the transport member 105. In other embodiments, the pulley sleeve 205 is freely movable on the associated frame support rod (not shown), such that movement of the transport members 105 through the pulley members 260 rotates, rolls or pivots the pulley sleeve 205 about the frame support rod (not shown).

Figure 5:
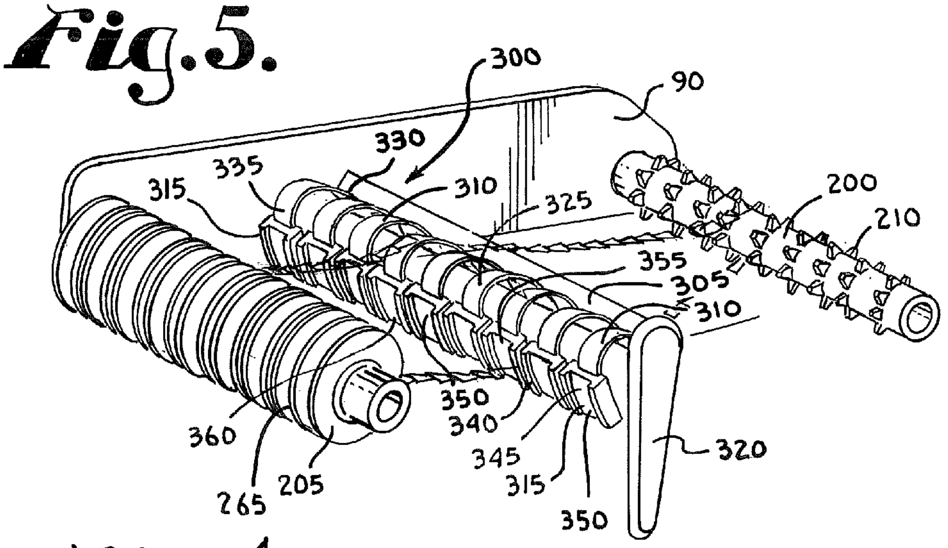
FIG. 5 is a perspective view of the stacker of FIG. 4, with portions broken away and shown in phantom to show greater detail thereof, illustrating a tensioning mechanism of the second embodiment and wherein the tensioning mechanism is a disengaged position.
Figure 4:
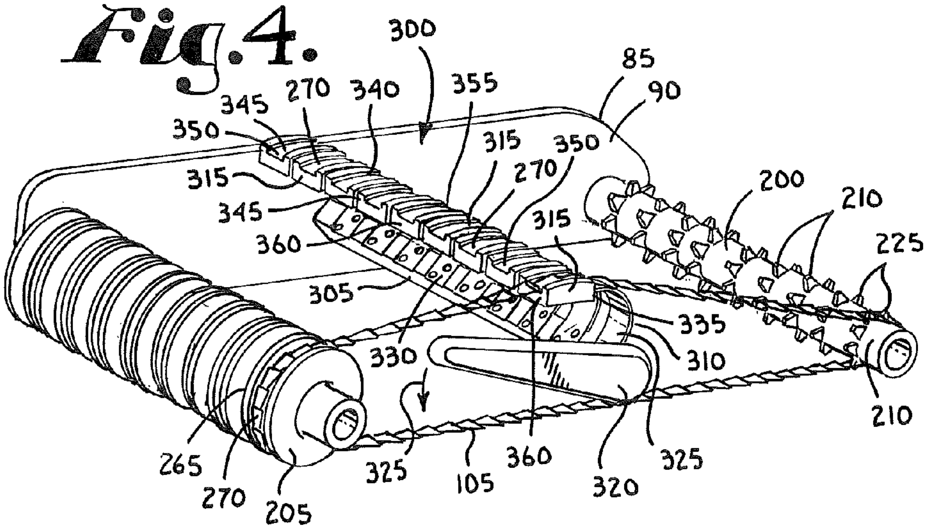
FIG. 4 is a reduced perspective view of the stacker of FIG. 1 in a second embodiment, with portions broken away and shown in phantom to show greater detail thereof, illustrating a tensioning mechanism of the second embodiment and wherein the tensioning mechanism is an engaged position.

Referring to FIGS. 4-5, in a second embodiment, the improved stacker 5 includes a releasable tensioning mechanism, generally 300, that engages and outwardly biases the transport members 105. The tensioning mechanism 300 includes a support bar 305 to which are attached a plurality of spring members 310. Each of the spring members 310 is connected to a guide plate 315. The support bar 305 is pivotably attached to the frame members 90 so that the support bar 305 can be reversibly rotated or turned about the support bar's 305 longitudinal axis (not shown). For example, the support bar 305 can be rotated from a first position shown in FIG. 4 to a second position shown in FIG. 6 by rotating or otherwise actuating the handle 320, such as indicated by the arrow 325. As described below, when the support bar 305 is in the first position (FIG. 4), the guide plates 315 engage and outwardly bias the associated transport members 105. When the support bar is in the second position (FIG. 5), the guide plates 315 are dis-engaged from and do not outwardly bias the associated transport members 105.

In the illustrated embodiment, the spring members 310 are leaf springs 325, however it is foreseen that other spring mechanisms, such a torsional springs, can be substituted for the leaf springs 325. In the illustrated embodiment, each leaf spring 325 is attached to the support bar 305 at a first end 330 thereof. Additionally, the second end 335 of each leaf spring 325 is attached to the bottom side (not shown) of a guide plate 315. Each guide plate 315 includes a top side 340 with a partially cylindrical slot or channel 345 with a generally rectangular cross-section and smooth low-friction engagement surface 350. The guide plates 315 are formed of a resilient, pore-less polymer with non-stick surfaces that do not retain food particles or harbor bacteria. In some embodiments, the guide plate 315 is coated or painted with a non-stick material, such as polytetrafluoroethylene or the like, such as is known in the art Each slot 345 is sized and shaped to slidingly receive a transport member 105 therethrough. Accordingly, the transport members 105 slide into the upstream ends 355 of respective slots 345, along the engagement surface 350, and then out of the downstream ends 360 of the slots 345. When engaged, such as is shown in FIG. 4, the leaf spring 325 pushes the guide plate engagement surface 350 outwardly, so as to outwardly bias the transport member 105. When disengaged, such as is shown in FIG. 5, the guide plates 315 are turned or pivoted downward and away from the transport members 105, so that the transport members 105 are no longer outwardly biased. Since the engagement surfaces 350 no longer press against the transport member s105, the transport members 105 are loosened. Loosening the transport member 105, by disengaging the tensioning mechanism 300 makes it easier to clean between the transport members 105 and the sprocket and pulley sleeves 200 and 205, respectively. Further, when the tension on a transport member 105 is reduced, it is easier to replace the transport member 105.

Figure 6:
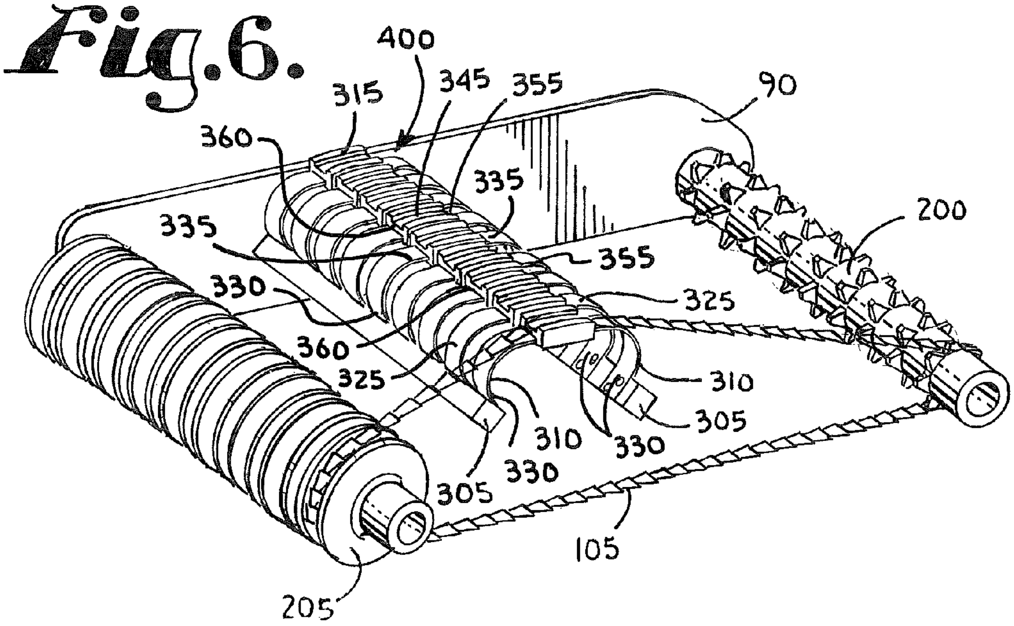
FIG. 6 is a reduced perspective view of the stacker of FIG. 1 in a third embodiment, with portions broken away and shown in phantom to show greater detail thereof, illustrating a tensioning mechanism of the third embodiment.

Referring to FIG. 6, in a third embodiment, the improved stacker 5 includes a non-releasable tensioning mechanism 400. The non-releasable tensioning mechanism 400 is substantially similar to the releasable tensioning mechanism 300, except that non-releasable tensioning mechanism 400 lacks a handle and is not dis-engageable. In particular, the non-releasable tensioning mechanism 400 includes a pair of support bars 305, a plurality of spring member pairs 405 and a plurality of guide plates 315. The support bars 305 are spaced apart and fixed to the frame members 90 so as to be non-pivotable. Each spring member pair 405 includes two opposed spring members 310, such as a pair of opposed leaf springs 325. As shown in FIG. 6, the spring members 310 are oriented so that a first of the spring members 310 is attached to a first of the support bars 305 and the second of the spring members 310 is attached to the second of the support bars 305, at the first ends of the first ends 330 of the spring members 310. The second ends 335 of the spring members 310 are both attached to a guide plate 315, so that the guide plate 315 is held between and above the sprig member second ends 335. The guide plates 315 of the third embodiment (see FIG. 6) are substantially the same as the guide plates 315 of the second embodiment (see FIGS. 4-5). Accordingly, the guide plates 315 of the third embodiment also outwardly bias the associated transport members 105 (see FIG. 6).

It is to be understood that while certain forms of the present invention have been illustrated and described herein, it is not to be limited to the specific forms or arrangement of parts described and shown.

What is claimed and desired to be secured by Letters Patent is as follows:

1. A food slice stacking apparatus for use with a food slicing apparatus, the stacking apparatus comprising:
- a) a frame with a pair of spaced apart parallel supports; and
- b) a transport mechanism including:
  - I) an endless transport member;
  - ii) a rotatable sprocket sleeve supported by the frame and engaging the transport member with sprockets so as to drive the transport member; and
  - iii) an integrally formed pulley sleeve with a smooth surface that engages the transport member and allows the transport member to freely move thereon, wherein the pulley sleeve is spaced apart from the sprocket sleeve and supported by the frame; wherein
  - iv) the pulley sleeve substantially prevents retention of food particles thereto during washing.

2. The apparatus according to claim 1, wherein:
- a) the sprocket sleeve includes a plurality of of sprocket groups equally spaced along a length of the sprocket sleeve;
- b) the pulley sleeve includes a plurality of pulley members equally spaced along a length of the pulley sleeve, such that wherein each of the pulley members is parallel with an opposed sprocket group, so as to provide sprocket-pulley pairs; and
- c) the sprocket-pulley pairs support and drive a transport member.

3. The apparatus according to claim 1, wherein:
- a) the transport member is a chain loop with links engaged by the sprocket sleeve so as to be driven in a downstream direction.

4. The apparatus according to claim 1, wherein the apparatus includes:
- a) a tensioning mechanism with a spring member and a guide plate; wherein
- b) the guide plate slidingly engages the transport member to apply pressure thereto.

5. The apparatus according to claim 4, wherein the guide plate includes a low friction material.

6. The apparatus according to claim 4, wherein the spring member is a leaf spring.

7. The apparatus according to claim 4, wherein the spring member is a pair of opposed leaf springs.

8. The apparatus according to claim 1, wherein:
- a) the transport mechanism is a plurality of transport mechanisms.

9. The apparatus according to claim 1, wherein:
- a) the transport mechanism is nine transport mechanisms.

10. A food slices stacking apparatus for use with a food slicing apparatus, the stacking apparatus comprising:
- a) a frame;
- b) a transport mechanism supported by the frame and including:
  - 1) an endless chain transport member;
  - 2) a selectively rotatable sprocket sleeve engaging the transport member with sprockets and driving the transport members;
  - 3) a pulley sleeve having a smooth surface and spaced from the sprocket sleeve; the transport member engaging and being supported by the smooth member; and
  - 4) a pair of parallel side members located on opposite sides of the pulley sleeve smooth surface and radially extending outward from the smooth surface; the side members maintaining the transport member on the smooth surface when the transport member is being driven.

11. the apparatus according to claim 10 wherein:
- a) the transport member is a first transport member and including a second transport member engaging both the sprocket sleeve and the pulley sleeve, the pulley sleeve smooth surface is a first smooth surface and including a second integrated smooth surface; the second transport member engaging the second smooth surface; and
- b) the first and second smooth surfaces being separated by one of the side members.

* * * * *